United States Patent
Barsness et al.

(10) Patent No.: US 9,009,120 B2
(45) Date of Patent: *Apr. 14, 2015

(54) ACTIVE MEMORY EXPANSION IN A DATABASE ENVIRONMENT TO QUERY NEEDED/UNEEDED RESULTS

(71) Applicant: International Business Machines Corporation, Armonk, NY (US)

(72) Inventors: Eric L. Barsness, Pine Island, MN (US); Paul S. Nelsestuen, Oronoco, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 60 days.

This patent is subject to a terminal disclaimer.

(21) Appl. No.: 13/681,521

(22) Filed: Nov. 20, 2012

(65) Prior Publication Data

US 2013/0080410 A1     Mar. 28, 2013

Related U.S. Application Data

(63) Continuation of application No. 12/944,455, filed on Nov. 11, 2010, now Pat. No. 8,554,747.

(51) Int. Cl.
*G06F 17/30* (2006.01)

(52) U.S. Cl.
CPC .... *G06F 17/30153* (2013.01); *G06F 17/30442* (2013.01)

(58) Field of Classification Search
None
See application file for complete search history.

(56) References Cited

U.S. PATENT DOCUMENTS

| | | | |
|---|---|---|---|
| 2009/0024752 A1 * | 1/2009 | Shitomi | 709/230 |
| 2009/0043734 A1 * | 2/2009 | Barsness et al. | 707/3 |
| 2009/0043793 A1 | 2/2009 | Barsness et al. | |
| 2010/0281004 A1 | 11/2010 | Kapoor et al. | |

OTHER PUBLICATIONS

PowerVM.net, Active Memory Expansion (AME), Feb. 11, 2010. http://www.powervm.net/2010/02/active-memory-expansion.html.*
International Search Report and Written Opinion of the ISA dated Jan. 12, 2012—International Application No. PCT/EP2011/068871.
U.S. Appl. No. 12/944,455, entitled "Active Memory Expansion in a Database Environment to Query Needed/Uneeded Results", filed Nov. 11, 2010.

* cited by examiner

*Primary Examiner* — Syed Hasan
(74) *Attorney, Agent, or Firm* — Patterson & Sheridan, LLP

(57) ABSTRACT

Techniques are described for estimating and managing memory compression for request processing. Embodiments of the invention may generally include receiving a request for data, determining if the requested data contains any compressed data, and sending the requesting entity only the uncompressed data. A separate embodiment generally includes receiving a request for data, determining if the requested data contains any compressed data, gathering uncompression criteria about the requested data, and using the uncompression criteria to selectively determine what portion of the compressed data to uncompress.

6 Claims, 8 Drawing Sheets

UNCOMPRESSION CONDITION TABLE

FIG. 7A

| CURRENT SYSTEM WORKLOAD (% OF THE CPU USED) | USER QUERY TYPE | | | |
|---|---|---|---|---|
| | EXECUTIVE | PROJECT MANAGER | JUNIOR ENGINEER | INTERN |
| 76-100 | √ | X | X | X |
| 51-75 | √ | √ | X | X |
| 26-50 | √ | √ | √ | X |
| 0-25 | √ | √ | √ | √ |

X - LEAVE COMPRESSED
√ - UNCOMPRESS

UNCOMPRESSION CONDITION TABLE

FIG. 7B

| CURRENT SYSTEM WORKLOAD (% OF THE CPU USED) | USER QUERY TYPE | | | |
|---|---|---|---|---|
| | EXECUTIVE | PROJECT MANAGER | JUNIOR ENGINEER | INTERN |
| 76-100 | √ | P | X | X |
| 51-75 | √ | √ | P | X |
| 26-50 | √ | √ | √ | P |
| 0-25 | √ | √ | √ | √ |

X - LEAVE COMPRESSED
√ - UNCOMPRESS
P - PARTIALLY UNCOMPRESS

ACTIVE MEMORY EXPANSION IN A DATABASE ENVIRONMENT TO QUERY NEEDED/UNEEDED RESULTS

CROSS-REFERENCE TO RELATED APPLICATIONS

This application is a continuation of co-pending U.S. patent application Ser. No. 12/944,455, filed Nov. 11, 2010. The aforementioned related patent application is herein incorporated by reference in its entirety.

BACKGROUND

The present invention generally relates to database management, and more particularly, to managing data storage that is composed of both compressed and uncompressed data by selectively uncompressing compressed data when responding to queries.

DESCRIPTION OF THE RELATED ART

Databases are computerized information storage and retrieval systems. A relational database management system is a computer database management system (DBMS) that uses relational techniques for storing and retrieving data. An object-oriented programming database is a database that is congruent with the data defined in object classes and subclasses.

Regardless of the particular architecture, a requesting entity (e.g., an application or the operating system) in a DBMS requests access to a specified database by issuing a database access request. Such requests may include, for instance, simple catalog lookup requests or transactions and combinations of transactions that operate to read, change and add specified records in the database. These requests (i.e., queries) are often made using high-level query languages such as the Structured Query Language (SQL). Upon receiving such a request, the DBMS may execute the request against a corresponding database, and return any result of the execution to the requesting entity.

As databases grow in size and in workload, particular requests may take a substantial amount of time and resources to execute. As such, database administrators may wish to control how memory is used. Data compression is one method of controlling the amount of time to execute a query by reducing the amount of paging needed to retrieve data stored in a secondary memory. Even though some paging is avoided, compressing and decompressing data requires additional system resources.

SUMMARY

Embodiments of the invention provide a method for managing the execution of a request by receiving a request that specifies data to be returned. The method, system and computer program product include retrieving the data specified in the request from a first memory location and storing the retrieved data at a second memory location, wherein the stored data includes compressed data and uncompressed data. Finally, the method, system, and computer program product transmit a result set responsive of the request which includes the uncompressed data and excludes the compressed data after determining that at least a portion of the data specified in the request consists of compressed data.

Other embodiments of the invention provide a method, system and computer program product for managing the execution of a request by receiving a request specifying data to be returned and retrieving the data specified in that request from a first memory location. The method, system and computer program product include storing the retrieved data at a second memory location, wherein the stored data includes first compressed data and first uncompressed data and then identifying uncompression criteria associated with the first compressed data. Upon determining that at least a portion of data specified in the request consists of first compressed data based on the uncompression criteria and an uncompression condition, the method, system and computer program product uncompress at least a portion of the first compressed data to create second uncompressed data by operation of one or more computer processors, wherein the remaining first compressed data creates second compressed data. Finally, the method, system and computer program product include transmitting a result set responsive to the request, the result set including first uncompressed data and second uncompressed data and excluding second compressed data.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 7A-7B are exemplary tables of uncompression logic, according to embodiments of the invention.

DETAILED DESCRIPTION

Figure 1A:
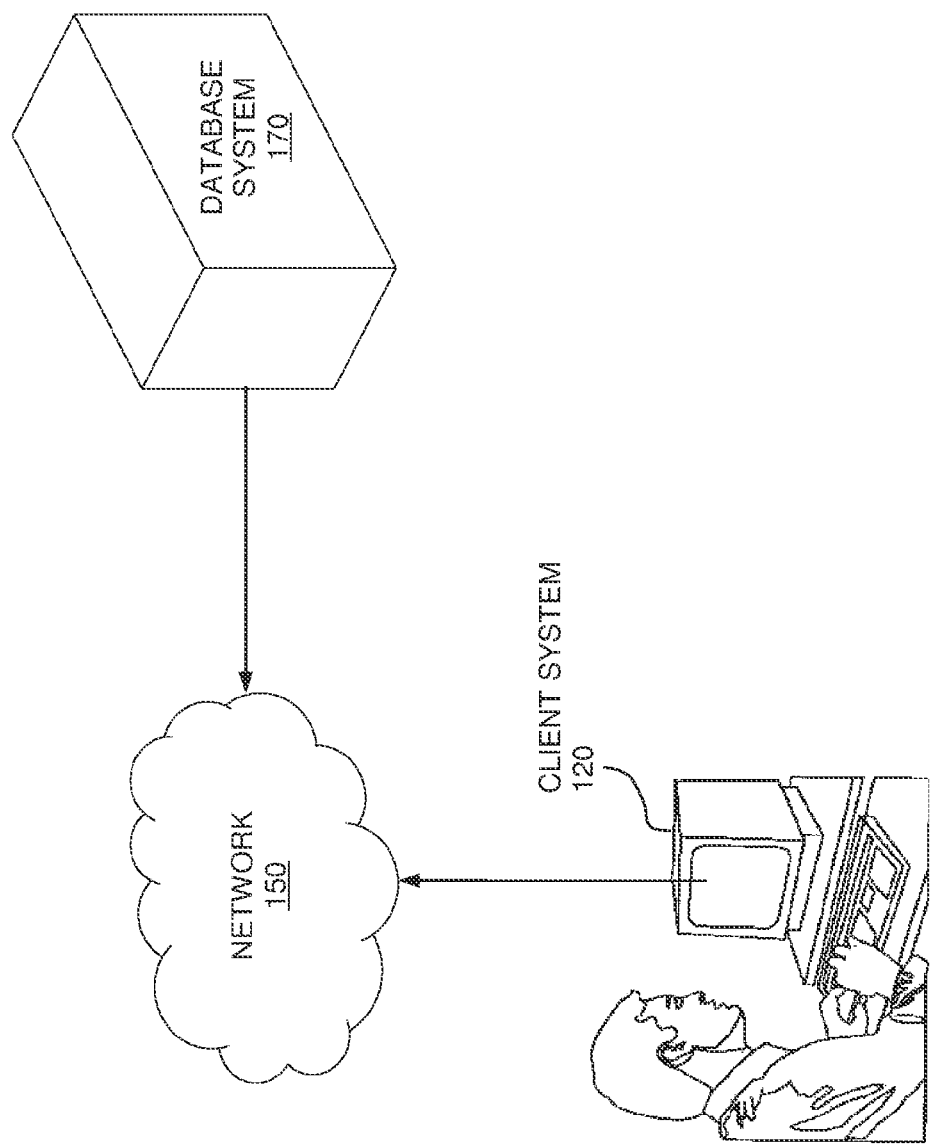
FIG. 1A-1B are block diagrams illustrating a networked system for estimating and uncompressing data, according to embodiments of the invention.

Some DBMS use data compression to create more space in a particular memory. Freeing additional space in memory through compression then allows additional data to be stored. In turn, this lessens the chance of paging (i.e., fetching data from a secondary storage), which is more time-consuming than compressing and decompressing data. Therefore, efficiently using the limited resources of a primary memory—even if doing so involves compression—will in general reduce the amount of time needed for a given query to execute.

However, constantly compressing and uncompressing data reduces query throughput in a DBMS. To minimize this drawback, a DBMS may compress and uncompress data selectively. When responding to a query that requests compressed data, a complete response requires the DBMS to spend system resources to uncompress the compressed data. Thus, in a DBMS that has memory divided into compressed data and uncompressed data, a query that requests compressed data will, in general, take more time to execute than a similar query without compressed data. The embodiments of the present invention manage compressed data that has been requested during a database query. However, the invention is not limited to a database system; one of skill in the art will recognize that other file systems may implement a process that performs the essential characteristics discussed herein.

In several embodiments of the present invention, the DBMS ignores the compressed data. By sending only uncompressed data when responding to a query, the DBMS saves processing time. However, if the query requests both compressed data and uncompressed data, then the DBMS returns only the uncompressed data—i.e., incomplete results. For example, a user may query a database for a large amount of data but does not want to wait for the complete results. Ignoring the compressed data permits the database to return the results of the query quicker than if the database first uncompressed the compressed data. Moreover, the database system may compress only data that is unlikely to be used. Accordingly, a querying entity is less likely to need any ignored compressed data.

In other embodiments, The DBMS determines whether to uncompress requested compressed data by evaluating system conditions or a query type. As an example, if the DBMS has only a few queries presently accessing data, uncompressing the data may not slow down any of the other executing queries. Moreover, certain user queries might be more important than others. Thus, during those queries, the DBMS may always uncompress requested compressed data.

In further embodiments, the DBMS uncompresses only a portion of the requested data by evaluating system conditions, the type of query that requested the compressed data, or a threshold limit on the amount of compressed data that may be uncompressed. Uncompressing a portion of the data is a compromise between completely ignoring the compressed data and uncompressing all of the requested compressed data.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the DBMS) or related data available in the cloud. For example, the DBMS could execute on a computing system in the cloud and selectively uncompress data that was requested by a query. In such a case, the DBMS could selectively decompress requested data and store the uncompressed data at a storage location in the cloud. Doing so allows a user to access this information from any computing system attached to a network connected to the cloud (e.g., the Internet).

Figure 1B:
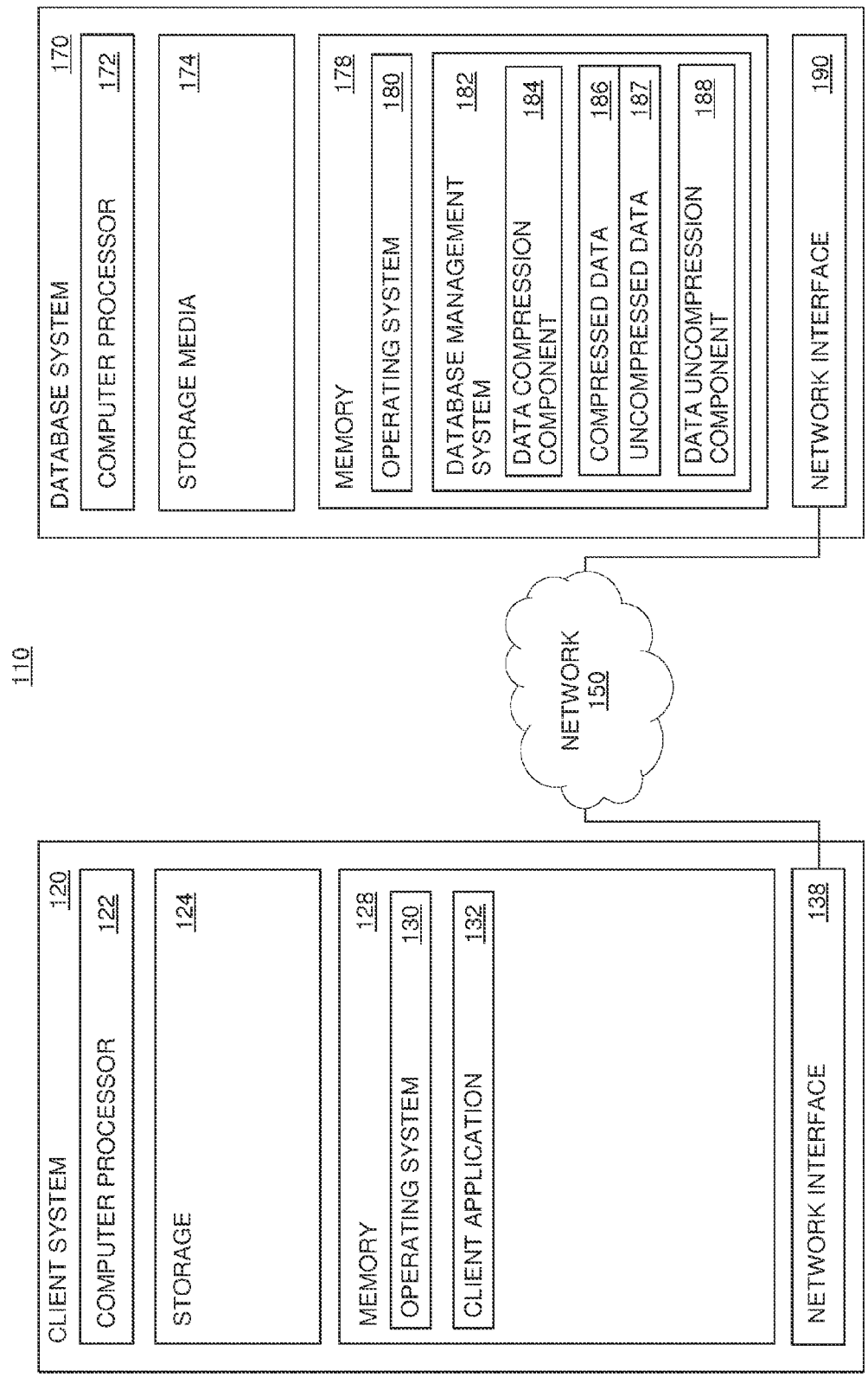

FIG. 1A-1B are block diagrams illustrating a networked system for estimating and managing memory usage for query processing, according to embodiments of the invention. As shown in FIG. 1A, the system 100 includes a client system 120 and a database system 170, connected by a network 150. Generally, the client system 120 may submit requests (i.e., queries) over the network 150 to a DBMS running on the database system 170. The term "query" denotes a set of commands for retrieving data from a stored database. Queries may take the form of a command language, such as the Structured Query Language (SQL), that lets programmers and programs select, insert, update, discover the location of data, and so forth. Generally speaking, any requesting entity can issue requests or queries against data in a database. For example, software applications (such as by an application running on the client system 120), operating systems, and, at the highest level, users may submit queries to the database. These queries may be predefined (i.e., hard coded as part of an application) or may be generated in response to input (e.g., user input). Upon receiving the request, the DBMS on the database system 170 may execute the request on a database specified in the request, and then return the result of the executed request.

In one embodiment, the database system 170 may shorten the amount of time required to execute a query by selectively compressing or uncompressing retrieved data. In the first half of the method, a DBMS selectively compresses the data. For example, the database system 170 may selectively compress memory used by the database compression system 170 to prevent paging. The term "paging" is a general term to describe how a DBMS may frequently fetch data from a secondary storage, e.g., a hard drive, and place it into memory, e.g., RAM. Selective compression may increase the memory available to the database and permit more data to be stored, thereby reducing paging to secondary memory storage. For example, assume that when executing a user request for data, a database system initially fetches enough data from a secondary memory storage to fill the primary memory. If the user request encompasses more data, the database system performs a second fetch to the secondary memory storage. Alternatively, the database system 170 can fetch more data from the secondary memory storage during the first fetch by selectively compressing some of the data. Thus, database system 170 may execute the user request without the need of a second fetch operation.

The database compression method described above is independent of the method or algorithm used to actually compress the data. Thus, the database system 170 can use any number of data compression algorithms after determining to compress the data. Possible algorithms include: data deduplication, run-length encoding, dictionary coder, Burrows-Wheeler transform, prediction by partial matching, or context mixing. Furthermore, as will be understood by one of ordinary skill in the art, any data compression algorithm capable of performing the functions described herein may be used.

In the second half of the method, a DBMS selectively uncompresses the requested data. Whenever a query requests data that includes both uncompressed and compressed data, the DBMS determines how much of the uncompressed data to return. Blindly uncompressing compressed data, however, wastes system resources and minimizes the advantages of compressing the data during the first half of the method. In one embodiment, the DBMS ignores compressed data. In such a case, returning incomplete results is acceptable since selective compression may be adjusted to compress only unimportant data. Alternatively, the DBMS evaluates the available system resources and determines whether enough resources are available to uncompress the data. Finally, in yet another embodiment, the DBMS uncompresses only a portion of the requested data while the rest is ignored.

FIG. 1B is a block diagram of a networked computer system configured to estimate and manage memory compression for query processing, according to one embodiment of the invention. As shown, the system 110 contains the client system 120 and the database system 170. The client system 120 contains a computer processor 122, storage media 124, memory 128 and a network interface 138. The computer processor 122 may be any processor capable of performing the functions described herein. The client system 120 may connect to the network 150 using the network interface 138. Furthermore, as will be understood by one of ordinary skill in the art, any computer system capable of performing the functions described herein may be used.

Illustratively, memory 128 contains an operating system 130 and a client application 132. Although memory 128 is shown as a single entity, memory 128 may include one or more memory devices having blocks of memory associated with physical addresses, such as random access memory (RAM), read only memory (ROM), flash memory or other types of volatile and/or non-volatile memory. The client application 132 is generally capable of generating database queries. Once the client application 132 generates a query, the query may be submitted to a DBMS (e.g., DBMS 182) for execution over the network 150. The operating system 130 may be any operating system capable of performing the functions described herein.

The database system 170 contains a computer processor 172, storage media 174, memory 178 and a network interface 190. The computer processor 172 may be any processor capable of performing the functions described herein. The database system 170 may connect to the network 150 using the network interface 190. Furthermore, as will be understood by one of ordinary skill in the art, any computer system capable of performing the functions described herein may be used.

In the pictured embodiment, memory 178 contains an operating system 180 and a DBMS 182. Although memory 178 is shown as a single entity, memory 178 may include one or more memory devices having blocks of memory associated with physical addresses, such as random access memory (RAM), read only memory (ROM), flash memory or other types of volatile and/or non-volatile memory. The DBMS 182 contains a data compression component 184, compressed data 186, uncompressed data 187, and a data uncompression component 188. In the present embodiment, the data compression component 184 determines whether to compress the requested data into compressed data 186 or leave it as uncompressed data 187 upon storing it into the memory 178. The data uncompression component 188, on the other hand, determines how much of the compressed data 186 to uncompress when it is requested by an executing query. The operating system 180 may be any operating system capable of performing the functions described herein.

Before discussing selectively uncompressing compressed data 186, a brief discussion on how data is selectively compressed is necessary. In at least one embodiment, Active Memory™ Expansion (AME) is used to compress a portion of requested data into memory. Currently, AME is implemented by the AIX® operating system in IBM's POWER7™ systems.

Figure 2:
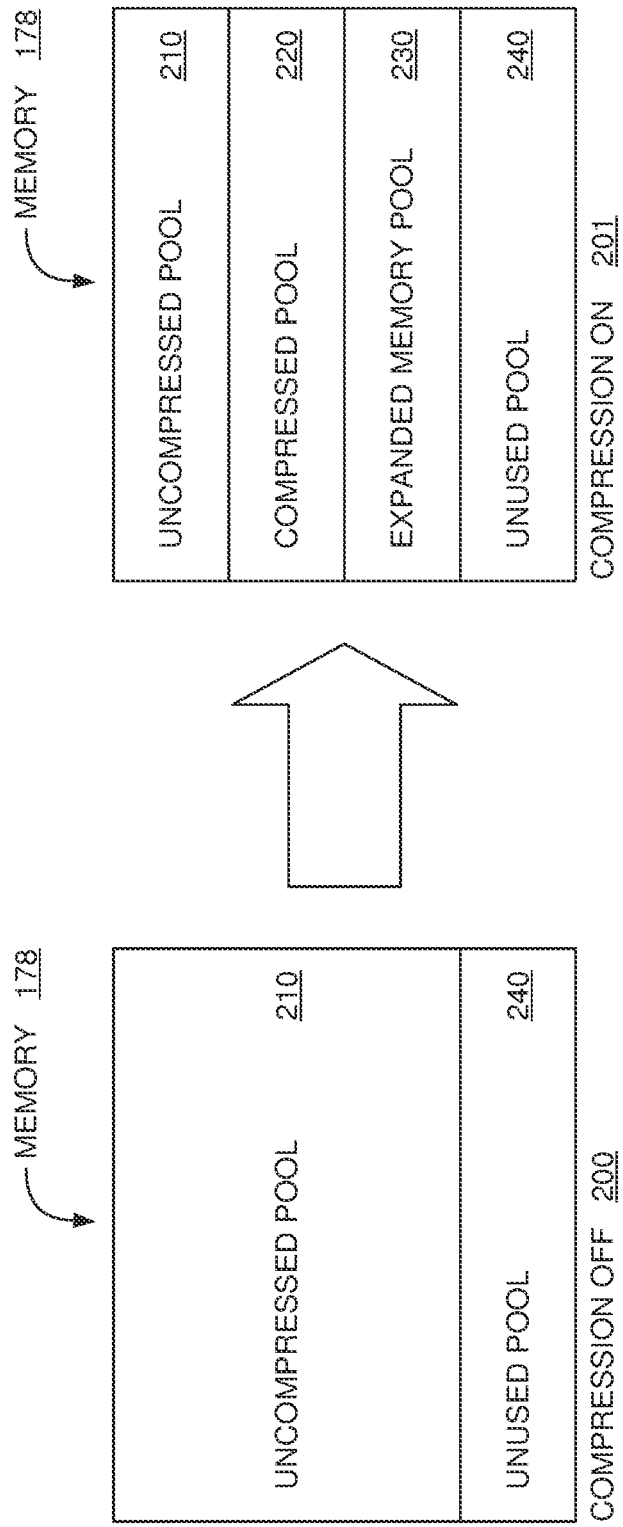
FIG. 2 is a block diagram illustrating the effect of memory compression, according to one embodiment of the invention.

FIG. 2 provides a graphical representation of the effect of AME on the memory 178 found in FIG. 1B, according to one embodiment of the invention. Note that the memory 178 has the same data storage capacity when the memory compression is turned off 200 and when the memory compression is turned on 201. With the compression turned off 200—i.e., AME is deactivated—the memory 178 contains two pools. The uncompressed pool 210 stores data that has not been compressed, while the unused pool 240 represents the unused data capacity of the memory 178. Upon activating AME 201, the compressed pool 220 appears. Also note that although FIG. 2 shows the various pools as being contiguous, in practice, memory regions allocated to a pool may be fragmented. One of ordinary skill in the art will recognize, however, that the portion of the memory 178 occupied by a pool is significant. A smaller, uncompressed pool 210 after compression is turned on 201 relates to a smaller percentage of memory 178 being occupied by the uncompressed pool 210. As shown, data once located in the uncompressed pool 210 has been compressed and now forms the compressed pool 220. The leftover capacity is labeled as the expanded memory pool 230, while the unused pool 240 remains unchanged.

After compression is turned on, the expanded memory pool 230 is now available to store more compressed or uncompressed data. A DBMS can use the expanded memory pool 230 to store additional data during fetches to a storage media 174. Thus, AME expands available memory and reduces paging.

Figure 3:
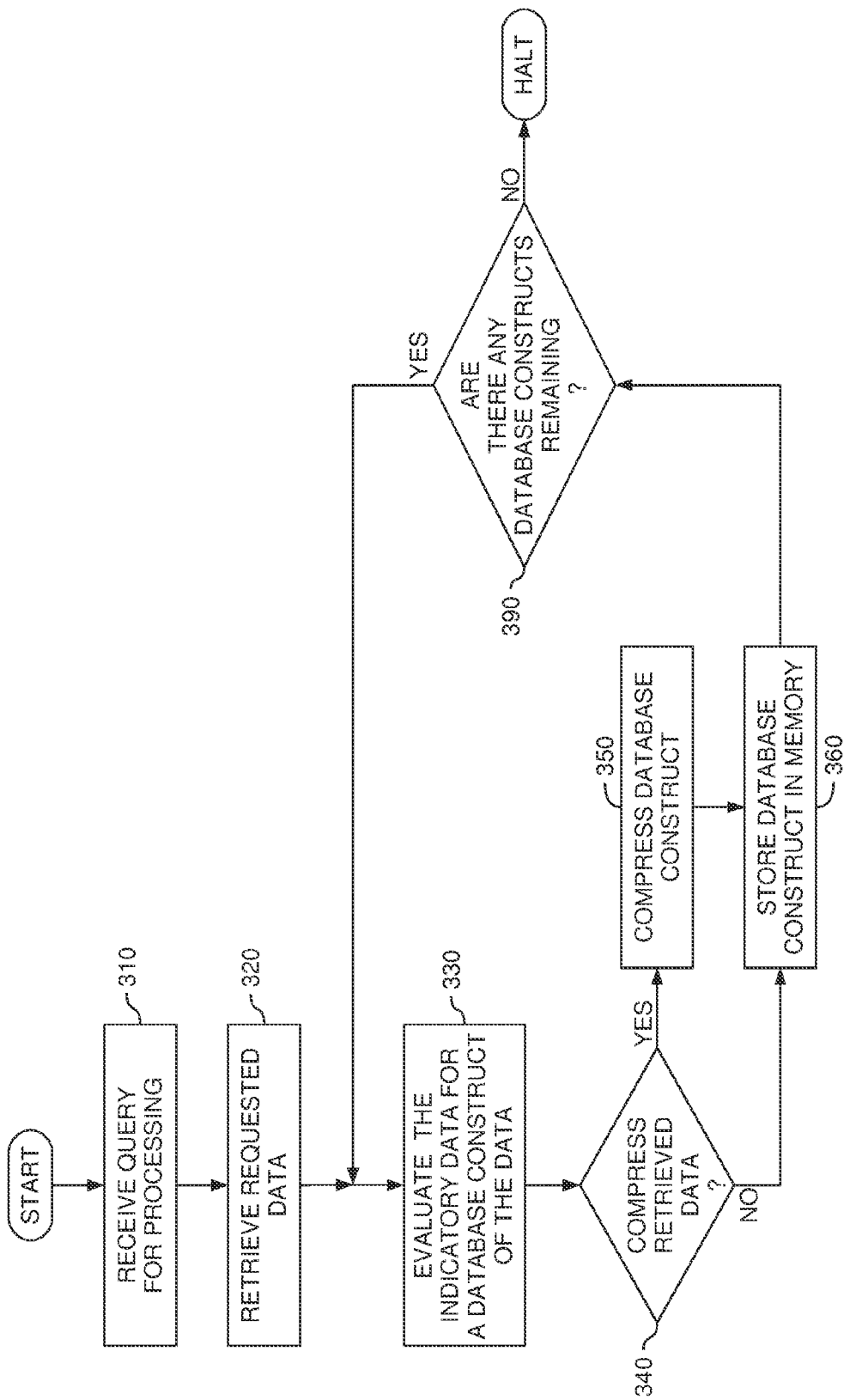
FIG. 3 is a flow diagram illustrating methods of uncompressing data, according to embodiments of the invention.

FIG. 3 is a flowchart illustrating a method of managing memory compression, according to one embodiment. In general, the database compression component 184 identifies at least one database construct found within the retrieved data and determines whether to compress the construct. As shown, the method starts at step 310 after the database system 170 receives a query requesting data. Such a query can originate from a client system 120, an administrator, an application, or another DBMS. Each of these requesting entities may be a different query type. At step 320, the database system 170 then uses the query to determine what data to fetch from the storage media 174. After the fetch, the data compression component 184 processes the retrieved data. At step 330, the data compression component 184 arranges a portion of the received data into an abstract database construct. This database construct can store any combination of retrieved data, including, e.g., a complete table (or tables) or portions of a table such as rows, columns, or records. For example, the data compression component 184 could bring a column of one table and combine it with a row of a different table to form a database construct. Moreover, a database construct may have multiple levels—i.e., a database construct stored within another database construct. For example, a table is one database construct while a row in that table is another.

In another embodiment, the data compression component 184 parses through the retrieved data pages 176 to find database constructs with associated metadata. For example, a table may have metadata that identifies the table as a tertiary (or unimportant) table. In such a case, the data compression component 184 ascertains whether to compress the entire table based on the metadata. In another embodiment, an Extensible Markup language (XML) document may be used to determine whether a row, column, or entry should be compressed when stored in memory 178. For example, both a column in a table and the table itself may have specific metadata that the data compression component 184 can evaluate independently to determine whether the two separate database constructs should be compressed. In another example, a column in one table may have the same associated metadata as a row in a separate table, which the data compression component 184 can then use to simultaneously decide whether to compress both the row and column.

After at least one database construct with associated metadata has been identified, at step 330 the data compression component 184 compares the metadata to a compression condition to determine whether the associated database construct should be compressed. In one embodiment, the data compression component 184 compares the metadata (which can be composed of values within a range, keys, frequency of access, or dates updated/entered) to a corresponding compression condition. In other words, for each type of metadata, the data compression component 184 will have a corresponding compression condition. Though the corresponding compression conditions will vary according to the type of metadata, these variations will all be referred to herein as compression conditions. The compression conditions can be, but are not limited to, numbers, alphabetic letters, flags, ranges, or tables. In general, the data compression component 184 compares the metadata associated with a database construct to a corresponding compression condition. If the data compression component 184 decides to compress the construct, the database construct is compressed at step 350 and stored as compressed data 186 in the memory 178. If not, at step 360 the construct is placed into memory 178 without compression.

Because a database construct may be created from only a portion of a retrieved data, in many instances it will only be a small part of the requested data. Accordingly, at step 390, the data compression component 184 determines if all the retrieved data and metadata have been parsed. Otherwise, the process returns to step 330 to determine whether another database construct is found among the retrieved data pages 176.

With these embodiments describing selective memory compression introduced, selective uncompression can now be discussed.

Figure 4:
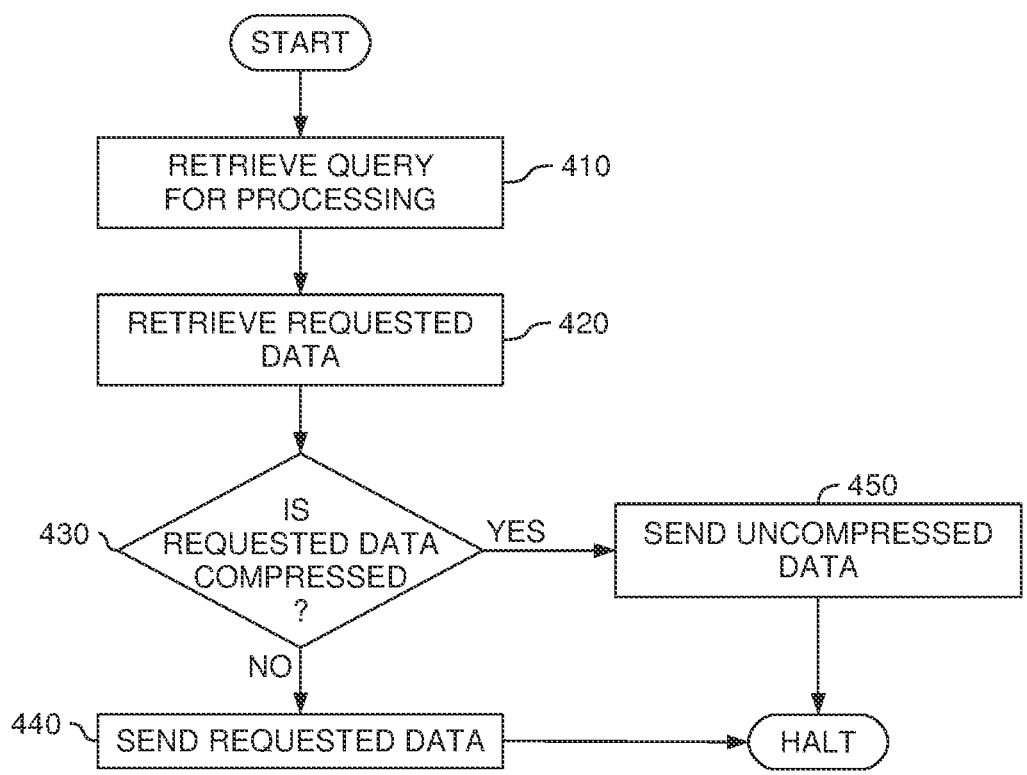
FIG. 4 is a flow diagram illustrating methods of uncompressing data, according to embodiments of the invention.

FIG. 4 is a flow diagram illustrating selective memory uncompression, according to one embodiment of the invention. At step 410, the method starts after the database system 170 receives a query requesting data. Such a query can originate from a client system 120, an administrator, an application, or another DBMS. Each of these requesting entities issues a different query type. The database system 170 then uses the query to determine what data should be retrieved. The DBMS 182 then issues a fetch request at step 420 to obtain the necessary data from the storage media 174. After the fetch, the data compression component 184 processes the retrieved data. As discussed above with FIG. 3, the data compression component 184 selectively determines the amount of retrieved data that is compressed and stored into memory 178 to form compressed data 186. In another embodiment, as a result of previous queries, the requested data is already located in memory 178 (either as compressed or uncompressed data). For example, one query fetched the data from storage media 174 which was then compressed. A related, subsequent query may then request the data that is found on the previously compressed data while the data remains stored in memory 178.

Before the data stored in the memory 178 can be returned to the user, the data uncompression component 188 establishes how much of the compressed data 186 and uncompressed data 187 should be sent. At step 430, the data uncompression component 188 determines if the requested data (now stored in memory 178) contains compressed data 186. If the requested data is devoid of compressed data 186, then the requested data is returned at step 440. Because data retrieved from storage media 174 may contain additional data that is not requested by the query (e.g., a look-up table), even if the data compression component 184 compresses some parts of the retrieved data, the data requested by the user may be uncompressed. For example, if the query requests that only a particular row from a table be returned, the fetch may still retrieve the entire data page containing that row from the storage media 174. Thus, even if the data compression component 184 performs some compression on the retrieved data, the component 184 may not compress the data actually requested by the user. However, if some of the requested data was compressed, the data uncompression component 188 separates the compressed data 186 from the uncompressed data 187.

At step 450, the data uncompression component 188 then sends the uncompressed data 187 to the DBMS 182 for transmission to the requesting entity but ignores the compressed data 186. In sum, this embodiment will return incomplete results to the requesting entity if any of the requested data was compressed into the memory 178 after fetching the data from the storage media 174. Nonetheless, this embodiment saves system resources by avoiding uncompressed data, thereby speeding up the job throughput of the DBMS 182. Additionally, an administrator may adjust the data compression component 184 to compress only retrieved data that is unimportant to the user, e.g., lookup tables, indexes, or tertiary tables, which are either unlikely to be requested during a query or, even if they are requested, unlikely to be missed.

Figure 5:
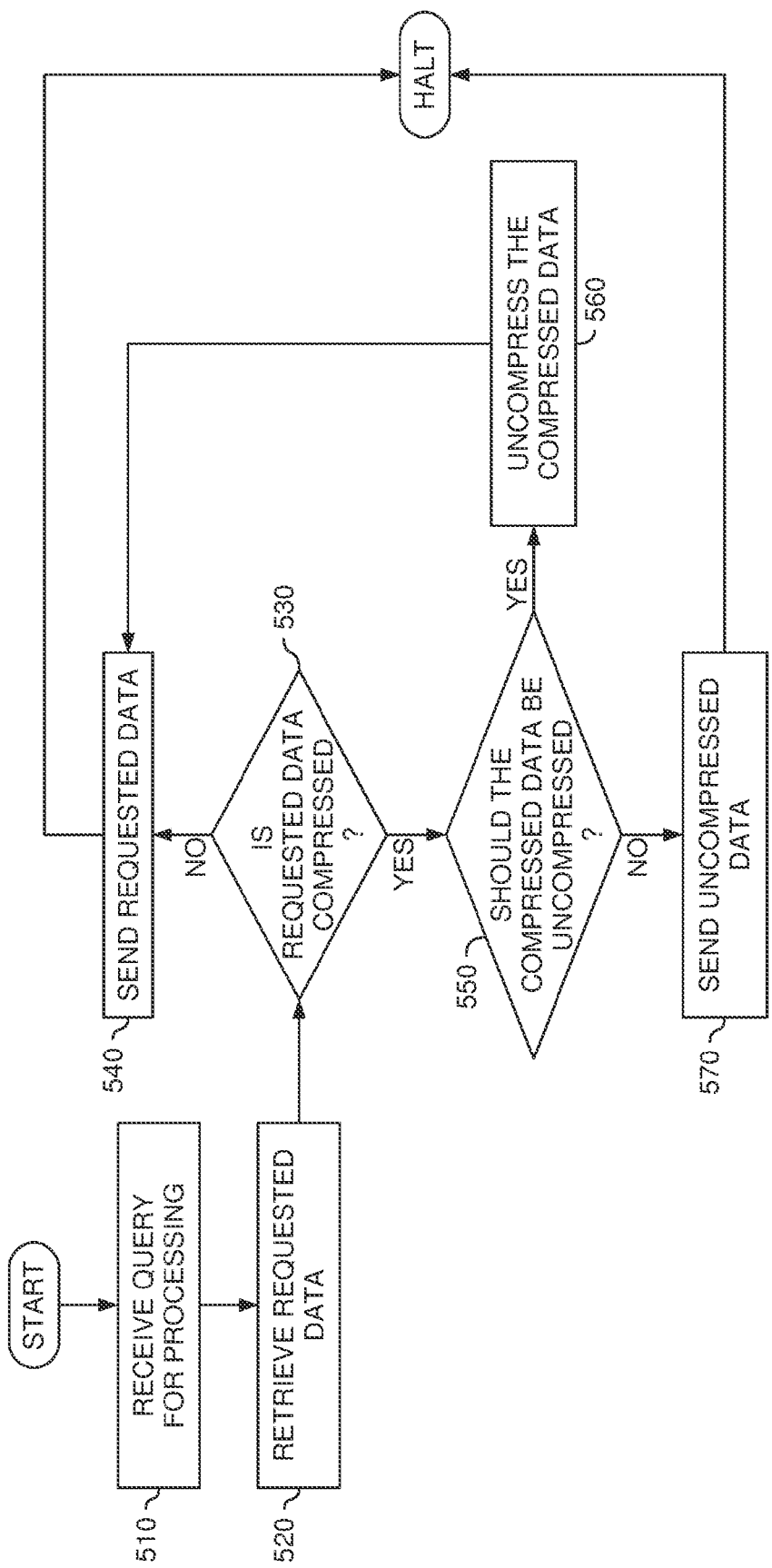
FIG. 5 is a flow diagram illustrating methods of uncompressing data, according to embodiments of the invention.

FIG. 5 is a flow diagram illustrating selective memory uncompression, according to another embodiment of the invention. Similar to FIG. 4, the process receives a query for processing at step 510, retrieves the data, determines what portion of the data to compress at step 520, and distinguishes between compressed data 186 and uncompressed data 187 when transmitting the requested data to the client system 120 at step 530. At step 550, the data uncompression component 188 identifies uncompression criteria associated with the compressed data. In general, uncompression criteria are data used by the data uncompression component 188 to determine whether to spend the processing time or system resources to uncompress the compressed data 186. Specifically, uncompression criteria may include system conditions, the query type that requested the compressed data, a threshold amount of compressed data requested, or any combination thereof. Each of these types of uncompression criteria will be discussed in detail below with certain embodiments. Nonetheless, one of ordinary skill in the art will recognize that a type of data that determines whether compressed data should be uncompressed may be used as uncompression criteria.

In addition to identifying uncompression criteria, the data uncompression component 188 uses an uncompression condition that corresponds to each type of uncompression criteria. In general, the data uncompression component 188 uses the uncompression condition and the uncompression criteria to determine whether to uncompress or ignore the compressed data 186. The uncompression condition could be a range, a key, a threshold amount of data, an index, a table, or a simultaneously running query. Each of these types of uncompression conditions will be discussed in detail below with certain embodiments.

Returning to step 550 in FIG. 5, the data uncompression component 188 may use the system conditions as uncompression criteria. System conditions could be the time of day the query occurs, the current system workload, the anticipated system workload, and so forth. In sum, the system conditions represents the ability of the database system 170 to perform the additional processing time needed to uncompress the requested compressed data 186. Exemplary system conditions include CPU usage, memory usage, virtual memory usage, disk I/O, etc. For example, the database system 170 may have peak hours during a day such that it would not be desirable to further burden the system 170 during those hours. Thus, the data uncompression component 188 will ignore any requests from queries to transmit compressed data 186. Specifically, the current time may be the uncompression criterion while the range of peak hours would be the uncompression condition. If the uncompression criterion falls within that range, the data uncompression component 188 will ignore all requested compressed data 186 and send only uncompressed data 570. Conversely, during non-peak hours, using additionally system resources to uncompress data to execute a query may not affect any simultaneously running queries. In such a case, at step 560 the database system 170 may use the system conditions as uncompression criteria and always uncompress the compressed data 186.

Instead of making a general assumption about the workload of the database system 170, the current system workload may be used as a uncompression criterion. In this embodiment, the data uncompression component 188 verifies that the database system 170 is capable of compression without slowing down other queries. The uncompression criterion would be the current workload of the computer processor, i.e., a percentage of the CPU usage, while the uncompression condition could a range of percentages that would permit uncompression. For example, the data uncompression component 188 uncompresses requested data if the current processor workload is less than 50%. Moreover, the data uncompression component 188 could anticipate the future workload of the database system 170 before allowing a present query to access compressed data. For example, if a current query requests that compressed data 186 be returned, but the DBMS 182 simultaneously receives another query that the data uncompression component 188 knows will require a majority of the system resources, then the data uncompression component 188 may use this knowledge about a simultaneously running query as an uncompression condition to deny the first query from uncompressing the compressed data 186.

Alternatively, the data uncompression component 188 can establish a desired threshold as the uncompression condition. In that case, if a query seeks too much compressed data—i.e., beyond a threshold amount—the data uncompression component 188 may not send any of the compressed data 186. The amount of compressed data (i.e. the uncompression criterion) can either be an individual portion of compressed data or the cumulatively sum of the portions. For example, if a query requests data from two tables, one of which has compressed data that exceeds the threshold but the other which does not, the data uncompression component 188 may either treat the compressed data as a sum and refuse to send any of the compressed data 186, or treat the portions individually and uncompress the compressed data 186 that is less than the threshold. Similarly, if only the sum of the compressed data 186 in the two tables exceeds the threshold (i.e., the compressed data in both tables is less than the threshold), the data uncompression component 188 may either uncompress all of the compressed data 186 or ignore the compressed data 186.

Additionally, during step 550, the data uncompression component 188 may use the query type as uncompression criteria. An inexhaustive list of query types includes: user queries, application queries, job queries or queries from other databases or subsystems. Although not shown in FIG. 1, job and subsystem requests do not necessarily originate from the client system 120. Instead, they are requests for data, for example, from other components within the database compression system 170. However, all queries types may not be equal in importance. The data uncompression component 188 may have an index or a table as a uncompression condition that informs the data uncompression component 188 to always uncompress requested data for one query group but not another. Further, a user query may be more important than an application query. In such a case, the data uncompression component 188 may permit an application query to access to compressed data 186—i.e. uncompress and transmit the data—only when a user query is not being executed simultaneously. Again, a table or a weighting formula may be used as the uncompression condition.

FIG. 7A is a diagram representing one embodiment of an uncompression condition in the form of a table. Instead of the uncompression condition being based solely on one factor, the data uncompression component 188 can balance two types of uncompression criteria to decide whether to uncompress the compressed data 186. Note that the data uncompression component 188 may perform the same logic by using a system of weights or equations to balance multiple uncompression criteria. This functionality permits a data compression component 188 to use many different sources of indicatory to decide whether to uncompress data. In the embodiment illustrated in FIG. 7A, the uncompression condition is a table that balances the type of query (X-axis) with the current system workload (Y-axis). This avoids having to create a simple dichotomy when compressed data 186 has two types of associated uncompression criteria—i.e., illustrates a middle-ground approach. As such, a query initiated by a project manager, in general, returns completer results than an intern. Nevertheless, if the current system workload is light enough, the Intern's query also returns complete results. One of ordinary skill will recognize that uncompression criteria may be formed by a combination of different types of information.

At step 550, if the data uncompression component 188 determines to uncompress the data, the data is uncompressed at step 560 and transmitted to the requesting client system 120 during step 540.

Figure 6:
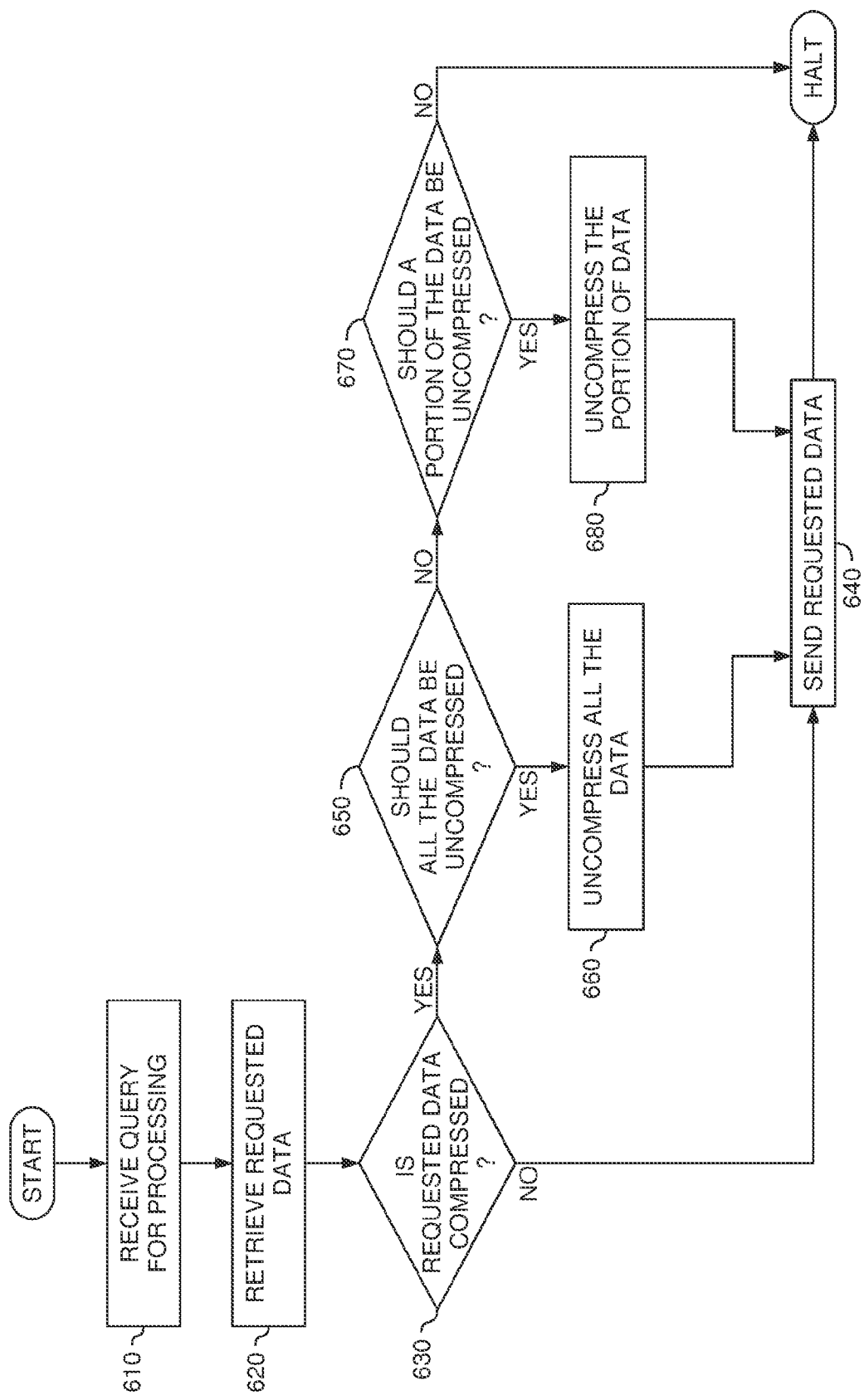
FIG. 6 is a flow diagram illustrating methods of uncompressing data, according to embodiments of the invention.

FIG. 6 is a flow chart illustrating selective memory uncompression, according to another embodiment of the invention. The DBMS 182 receives a query for processing at step 610, retrieves the data, determines what portion of the data to compress during step 620, and distinguishes between compressed data and uncompressed data when transmitting the requested data to the client system 120 at step 630. Further, the method of FIG. 6 may also use the different types of uncompression criteria discussed above (e.g., query types, system conditions, and amounts of compressed data) to determine whether to uncompress all or none of the requested compressed data 186. However, at step 670, the data uncompression component 188 determines whether to uncompress a portion of the requested compressed data. In other words, the data uncompression component 188 may evaluate uncompression criteria to determine whether only a portion of the requested compressed data 186 should be uncompressed and transmitted to the requesting entity. In this embodiment, the data uncompression component 188 may use all of the uncompression criteria described above with reference to FIG. 5 individually, or in combination, to determine whether to uncompress a portion of the requested compressed data 186. For example, the data uncompression component 188 may use a query type in conjunction with the current system workload as the uncompression criteria. Like in the method shown in FIG. 5, the uncompression condition can consider and balance multiple sources of uncompression criteria.

FIG. 7B illustrates a table that may be used as a uncompression condition which implements partial uncompression. If the user submitting the query is a project manager, for example, but the current system workload is near maximum capacity, instead of refusing to uncompress any compressed data 186, the data uncompression component 188 may partially uncompress the compressed data 186—e.g., the first few rows of a table. Additionally, the ability to partially uncompress compressed data 186 does not mean that even partial uncompression is always warranted. For example, as shown by FIG. 7B, if an intern initiates a query while the current system workload is above 50%, the data uncompression component 188 does not uncompress even a portion of the compressed data; rather, only the uncompressed data 187 will be returned. Further, one of ordinary skill will recognize that depending on the size of the table used as the uncompression condition in FIG. 7B, the data uncompression component 188 can alter the size of the portion to be uncompressed.

Alternatively, the data compression component 188 may use a threshold to determine whether to uncompress a portion of the compressed data. In such a case, if the amount of compressed data to be uncompressed during a query exceeds the threshold, instead of ignoring all of the compressed data 186, the data compression component 188 may uncompress only a portion. Moreover, the invention may use multiple thresholds as uncompression conditions. For example, one threshold could indicate that the data uncompression component 188 should uncompress only a portion, but a second, higher threshold could indicate that compressed data 186 should be completely ignored. Further, a plurality of thresholds may be used such that each subsequently higher threshold corresponds to less of the compressed data being uncompressed, either per percentage or per actual amount of data. Additionally, when the data uncompression component 188 only uncompresses a portion of the compressed data 186, it need not be the first available data (i.e., the first few rows of a table). The data uncompression component 188 may choose to selectively uncompress rows from the middle of a table, the end of a table, entries at the end of a row or column, or some combination thereof.

In an alternative embodiment related to FIG. 6, steps 650 and 660 may be omitted. Thus, the modified process would then determine at step 670 whether only a portion of the compressed data 186 should be uncompressed instead of all of the compressed data 186.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method of managing data in memory:
    receiving a request specifying data to be returned;
    retrieving, by operation of one or more computer processors, the data specified in the request from a memory location wherein the specified data includes compressed data and first uncompressed data;
    identifying a requesting entity ID that transmitted the request;
    upon determining that at least a portion of data specified in the request consists of compressed data, determining at least a portion of the compressed data to uncompress by comparing the requesting entity ID with a performance condition associated with the memory location;
    uncompressing the portion of the compressed data to create second uncompressed data and a remaining compressed portion of the compressed data; and
    transmitting a result set responsive to the request, the result set including first uncompressed data and second uncompressed data and excluding the remaining compressed portion.

2. The method of claim 1, wherein determining at least a portion of the compressed data to uncompress is based on a data structure indicating the portion of the compressed data to uncompress based on the requesting entity ID and a currently performance condition associated with the memory location.

3. The method of claim 1, wherein the compressed data having been compressed by active memory expansion.

4. The method of claim 1, wherein the portion of the compressed data includes at least one database construct, the database construct comprising at least one of: a database table row, a database table column, a database table record, a database table, and combinations thereof.

5. The method of claim 1, wherein the performance condition is at least one of: a CPU usage, memory usage, virtual memory usage, disk I/O, and peak hour ranges.

6. The method of claim 1, wherein the requesting entity ID comprises at least one of: a user ID, a client system ID, a job ID, an application ID, a subsystem ID, and a database system ID.

* * * * *